United States Patent [19]
Sakakibara et al.

[11] Patent Number: 5,596,441
[45] Date of Patent: Jan. 21, 1997

[54] OPTICAL POLARIZATION CONTROLLER

[75] Inventors: Nobuhiro Sakakibara, Tokyo; Kazuo Aida, Yokohama; Kiyoshi Nakagawa, Miura-gun, all of Japan

[73] Assignees: Ando Electric Co., Ltd.; Nippon Telegraph and Telephone Corporation, both of Tokyo, Japan

[21] Appl. No.: 417,679

[22] Filed: Apr. 6, 1995

[30] Foreign Application Priority Data

Apr. 13, 1994 [JP] Japan .................... 6-075189

[51] Int. Cl.$^6$ .................................. H04B 10/06
[52] U.S. Cl. .................... 359/192; 359/122; 359/156; 359/246
[58] Field of Search .................... 359/246, 191, 359/192, 122, 156

[56] References Cited

U.S. PATENT DOCUMENTS 5,052,051  9/1991  Naito et al. .................... 455/619

FOREIGN PATENT DOCUMENTS 60-184229  9/1985  Japan .................... 359/192
4-30634   2/1992  Japan .................... 359/156

*Primary Examiner*—Georgia Y. Epps
*Assistant Examiner*—Dawn-Marie Bey
*Attorney, Agent, or Firm*—Finnegan, Henderson, Farabow, Garrett & Dunner, L.L.P.

[57] ABSTRACT

An optical polarization controller comprises a polarization control element, a polarizer, a light divider and a photo-detector. The polarization control element rotates a plane of polarization of an Input signal light by a rotation angle in a predetermined rotational direction and outputs the result as a rotated signal light. The polarizer extracts a component of the rotated signal light having a predetermined plane of polarization and outputs the component as a polarized signal light. The light divider divides the polarized signal light into a plurality of polarized signal lights which have the same planes of polarization as the plane of the polarized light outputted by the polarizer. The photo-detector detects a level of one of the plurality of polarized signal lights and supplies a control signal indicating the level to the polarization control element. Under this control, the plane of polarization of the signal light outputted by the polarization control element is controlled so as to correspond to the plane of polarization of the light divider.

5 Claims, 3 Drawing Sheets

OPTICAL POLARIZATION CONTROLLER

Background of the Invention

1. Field of the Invention

The present invention relates to an optical polarization controller employed in optical heterodyne detecting devices which are used for optical communication, optical information processing or optical measurement.

2. Background Art

Optical heterodyne detecting devices are used in optical communication systems as demodulation means. In the communication system, a signal light, which is modulated based on information to be sent, is transmitted from a transmitter, and the signal light is received by a receiver. In the receiver, a local oscillation light is generated by a local oscillator of the heterodyne detecting device and the local oscillation light is supplied to a mixer. The received signal light is mixed with the local oscillation light by the mixer. As a result, a beat signal indicating the information sent from the transmitter is obtained.

In the optical heterodyne detecting devices, when mixing the input signal light and the local oscillation light, the plane of polarization of the input signal light should correspond to the plane of polarization of the local oscillation light.

If the planes of polarization of the input signal light and the planes of polarization of the local oscillation light cross each other, the sensitivity of the receiving light signal is degraded. Specifically, if the plane of polarization of the input signal light is perpendicular to the plane of polarization of the local oscillation light, there is no interference between the lights and no beat signal is obtained from the mixer. Therefore, no information can be detected from the input signal light.

In order to overcome this problem, a polarization control element is provided in the optical heterodyne detecting device.

FIG. 4 shows the configuration of a conventional device. In FIG. 4, a polarization control element 2 which receives an input signal light 2A to be demodulated. The polarization control element rotates the plane of polarization of the signal light 2A and outputs a signal light 2B which has a rotated plane of polarization. The rotation angle between the planes of polarization of signal light 2A and of polarization of signal light 2B is controllable.

A light mixer 31 mixes the signal light 2B and a local oscillation light 7. The light mixer 31 outputs a pair of balanced signal lights which indicate the mixed result. The balanced signal lights complement each other. That is to say, the balanced signal lights have the same amplitude, and the phase of one of the balanced signal lights is shifted by ½ period from the phase of the other.

A balanced type-receiver 32 has two photo-detectors and an electronic differential amplifier (not shown). The balanced signal lights, which are outputted by the light mixer 31, are converted into electronic signals by the photo-detectors. The electronic signals thus converted are inputted to the differential amplifier and differential amplification is carried out. As a result, a beat signal 32A having a frequency corresponding to the frequency difference between the signal light 2B and the local oscillation light 7 is obtained from the differential amplifier. In this differential amplification, common mode noises of the two electronic signals are canceled. Therefore, in the beat signal thus obtained, the noise component due to the DC level variations of the balanced signal lights is reduced. Furthermore, the noise components due to the variation in time of the light amount of the input signal light 2A and to AM (amplitude modulated) noise of the local oscillation light 7 are also reduced.

In this configuration, if the rotation angle of the plane of polarization of the polarization control element 2 is gradually varied, the output level of the beat signal 32A becomes maximum when the plane of polarization of signal light 2B corresponds to the plane of polarization of local oscillation light 7.

Therefore, it is possible to optimize the plane of the signal light 2B by monitoring the level of the beat signal 32A and by controlling the rotation angle of the polarization rotating component 2 so that the beat signal 32A having the maximum level is monitored.

However, the background art has the following problems:

(1) When the frequency difference between the signal light 2A and the local oscillation light 7 is greater than the pass band width of the balanced-type receiver 32, no beat signal is obtained from the balanced-type amplifier.

(2) When the plane of polarization of the signal light 2B is perpendicular to the plane of polarization of the local oscillation light 7, no beat signal is obtained.

On the other hand, no beat signal is obtained when the frequency difference between the lights 2A and 7 is greater than the pass bandwidth as described above.

Therefore, if no beat signal is monitored, it is impossible to judge whether the frequency difference is greater than the pass bandwidth or the planes of polarization are perpendicular to each other.

SUMMARY OF THE INVENTION

Accordingly, it is an object of the present invention to provide an optical polarization controller which can automatically control the plane of polarization of an input signal light so that the input signal light thus controlled can be demodulated by an optical heterodyne detector in the best condition.

In an aspect of the present invention, there is provided an optical polarization controller comprising a polarization control element for rotating a plane of polarization of an input signal light by a rotation angle in a predetermined rotational direction and for outputting the result as a rotated signal light, a polarizer for extracting a component of the rotated signal light having a predetermined plane of polarization and for outputting the component as a polarized signal light, a light divider for dividing the polarized signal light into a plurality of polarized signal lights which have the same planes of polarization as the plane of the polarized light outputted by the polarizer, and a photo-detector for detecting a level of one of the plurality of polarized signal lights and for supplying a control signal indicating the level to the polarization control element to control the rotation angle.

Therefore, in accordance with this invention, the plane of polarization of the output signal light of the polarization control element is controlled based on the control signal which indicates the level of one of the polarized signal lights outputted from the light divider. Under this control, the plane of polarization of the signal light outputted from the polarization control element is controlled so as to correspond to the plane of polarization of the light divider.

Furthermore, the present invention provides an optical polarization controller comprising a polarization control element for rotating a plane of polarization of an input signal light by a rotation angle in a predetermined rotational direction and for outputting the result as a rotated signal light, a polarizer for extracting a component of the rotated signal light having a predetermined plane of polarization and for outputting the component as a polarized signal light, a light mixer for mixing the polarized signal light and a local oscillation light having the same plane of polarization as the plane of polarization of the polarized signal light and for outputting balanced signal lights which complement each other and have the same planes of polarization as the plane of polarization of the polarized signal light, and a balanced-type receiver for converting the balanced signal lights into electronic balanced signal lights, and for detecting a level of one of the electronic balanced signal lights and supplying a control signal indicating the level to the polarization control element to control the rotation angle, and for outputting a beat signal having a frequency corresponding to a frequency difference between the input signal light and the local oscillation light.

In the above optical polarization controller, the light mixer and the balanced-type receiver are components of an optical heterodyne detector. The polarized signal light outputted from the polarizer is directly supplied to the light mixer of the optical heterodyne detector. Therefore, the transmission loss of signal light can be reduced.

DETAILED DESCRIPTION OF THE PREFERRED EMBODIMENTS

Hereinbelow, preferred embodiments of the present invention will be explained with reference to the Figures.

A. First Preferred Embodiment

Figure 1:
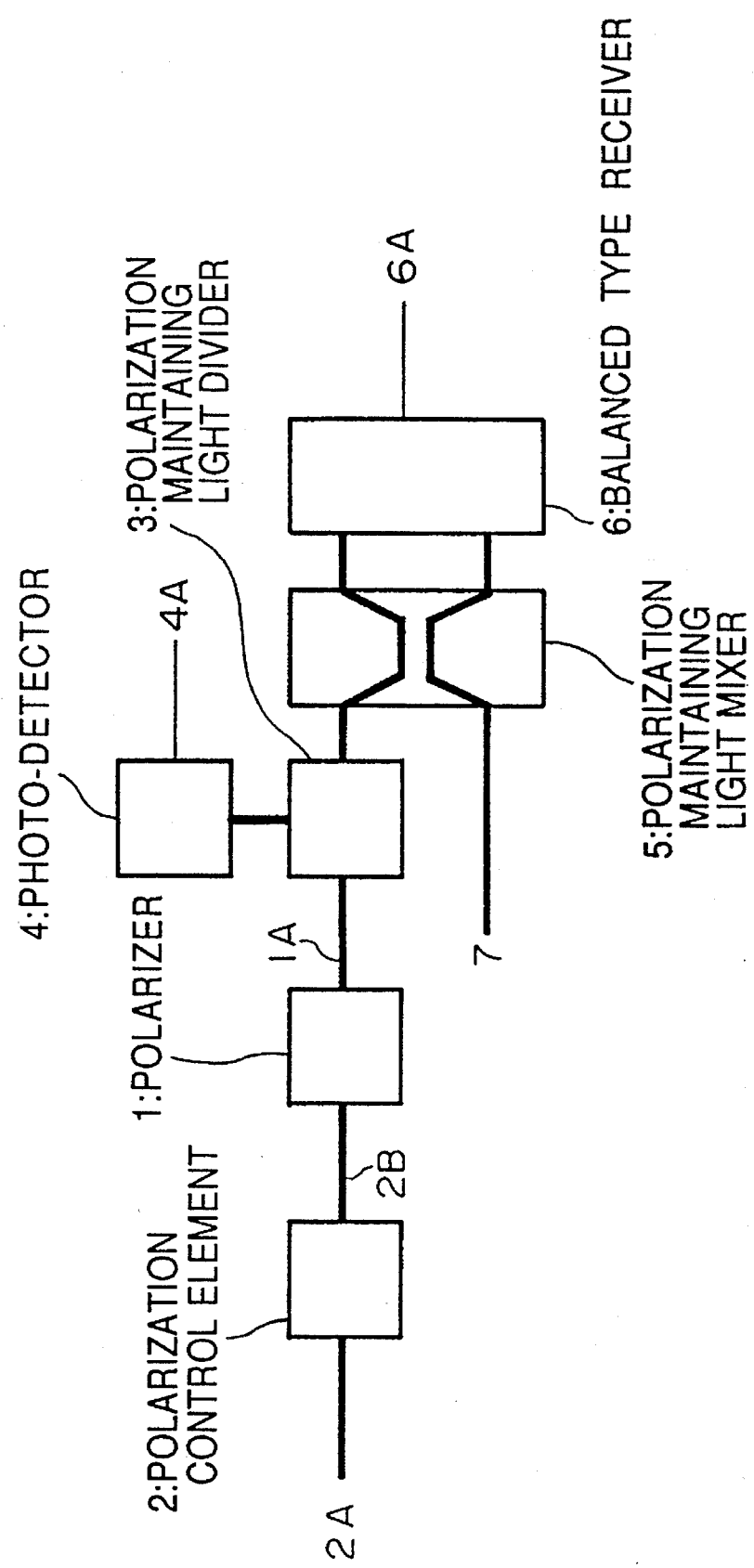
FIG. 1 is a block diagram showing the structure of an optical polarization controller according to a first preferred embodiment of the present invention.

FIG. 1 is a block diagram showing the overall structure of an optical polarization controller according to a first preferred embodiment of the present invention.

In the optical polarization controller, the input signal light 2A is supplied to the polarization control element 2 and the plane of polarization thereof is thereby rotated. The output signal light 2B of the polarization control element 2 is supplied to a polarizer 1.

The polarizer 1 extracts a component having a specified plane of polarization from the signal light 2B and outputs the extracted component as a polarized signal light 1A. The polarized signal light 1A thus outputted is supplied to a polarization-maintaining light divider 3.

The polarization-maintaining light divider 3 divides the polarized signal light 1A into two polarized signal lights having the same planes of polarization as the plane of polarization of the polarized signal light 1A. One of the two polarized signal lights is supplied to a photo-detector 4 and the other is supplied to a polarization-maintaining light mixer 5 which is provided for heterodyne detection.

The polarization-maintaining light mixer 5 receives the input signal light outputted by the polarization-maintaining light divider 3 (i.e., a part of the polarized signal light 1A) and a local oscillation light 7. The polarization-maintaining light mixer 5 mixes the lights 1A and 7 while maintaining the planes of polarization of the lights and outputs the mixed result as a pair of balanced signal lights.

In this optical polarization controller, the polarizer 1, the polarization-maintaining light divider 3 and the polarization-maintaining light mixer 5 are positioned so that the polarized signal lights outputted from them have a plane of polarization corresponding to the plane of polarization of the local oscillation light 7.

The balanced signal lights outputted from the polarization-maintaining light divider 3 complement each other. These balanced signal lights are supplied to a balanced-type receiver 6 having photo-detectors and a differential amplifier. The balanced signal lights are converted to balanced electronic signals by the photo-detectors and a differential amplification is carried out on the balanced electronic signals. As a result a beat signal 6A is outputted from the balanced type receiver 6.

The photo-detectors 4 receives the polarized signal light 1A via the polarization-maintaining light divider 3 and outputs a control signal which indicates the level 4A of the polarized signal light 1A. The control signal thus outputted is supplied to the polarization control element 2.

Here, if the rotation angle between the plane of polarization of the polarizer 1 and the plane of polarization of the polarized signal light 2B is defined as $\theta$, the amplitude of the portion of the signal light 1A passing through the polarizer 1A is proportional to $\cos^2\theta$.

Therefore, the level 4A of the polarized signal light, which is received by the photo-detector 4, indicate the degree of correspondence between the plane of polarization of the polarized signal light 2B and the plane of polarization of the polarizer 1. That is to say, if the plane of polarization of the polarized signal light 2B perfectly corresponds to the plane of polarization of the polarizer 1 (i.e., $\theta=0$), the level 4A of the polarized light becomes maximum. If the plane of polarization of the signal light 2B is perpendicular to the plane of polarization of the polarizer 1 (i.e., $\theta=90°$), the level 4A becomes minimum.

The control signal indicating the level 4A is supplied to the polarization control element 2. The polarization control element 2 is controlled based on the control signal so that the plane of polarization of the signal light 2B corresponds to the plane of polarization of the polarizer 1 (i.e., the plane of polarization of the local oscillation light 7) and the level 4A becomes the maximum value. When the level 4A becomes maximum, the beat signal 6A having the maximum level is obtained from the balanced-type receiver 6.

Next, the operation of the preferred embodiment will be described.

The signal light 2A to be demodulated is supplied to the polarization control element 2. The plane of polarization of the signal light is then rotated by the polarization control element in a specified direction by a rotation angle which is controlled based on the control signal from the photo-detector 4. As a result, the signal light 2B, the plane of polarization of which is thus controlled, is obtained from the polarization control element 2.

The signal light 2B thus obtained is supplied to the polarizer 1. The polarizer 1 then selects the polarized signal light 1A from the signal light 2B and outputs the selected polarized light. This polarized signal light 1A has the same plane of polarization as the plane of polarization of the polarizer 1.

The polarized signal light 1A thus outputted is divided into two polarized signal lights by the polarization-maintaining light divider 3. One of the two polarized signal light is supplied to the polarization-maintaining light mixer 5 and the other is supplied to the photo-detector 4.

In the polarization-maintaining light mixer 5, the polarized signal light 1A and the local oscillation light 7 are mixed maintaining the planes of polarization of the lights. The balanced signal lights indicating the mixed result are outputted from the polarization-maintaining light mixer 5 and are supplied to the balanced-type receiver 6. As a result, the beat signal 6A is outputted from the balanced-type receiver 6. At this time, if the plane of polarization of the signal light 2B does not correspond to the plane of polarization of the local oscillation light 7, the level of the beat signal 6A is lower than the maximum level.

On the other hand, the polarized signal light 1A is supplied to the photo-detector 4 via the polarization-maintaining light divider 3. The level 4A of the polarized light thus supplied is detected by the photo-detector 4 and the control signal indicating the level 4A s supplied to the polarization control element 2.

If the plane of polarization of the polarized signal light 2B does not correspond to the plane of polarization of the polarizer 1, the level 4A becomes lower. In this case, the rotational angle of the polarization control element 2 is controlled based on the control signal so that the level 4A becomes the maximum value.

When the level 4A reaches the maximum level, the plane of polarization of the signal light 2B perfectly corresponds to the plane of polarization of the polarizer 1. The signal light 2B having such a plane of polarization is supplied to the polariza- tion-maintaining light mixer 5 via the polarizer 1 and via the polarization-maintaining light divider 3. In this case, the plane of polarization of the signal light 2B perfectly corresponds to the plane of polarization of the local oscillation light 7. Therefore, a beat signal 6A having the maximum level is obtained.

As described above, in the preferred embodiment, the output signal of the balanced-type receiver 6 is not used for controlling the plane of polarization of the polarization control element 2. The component having the same plane of polarization as the plane of polarization of the local oscillation light 7 is extracted from the signal light 2B and the plane of polarization of the polarization control element 2 is controlled based on the level of such a component. Therefore, a balanced-type receiver having a wide band is not required. The control is based only on the level of the above component. Therefore, the plane of polarization of the polarization control element 2 is accurately controlled even if the frequency difference between the signal light and the local oscillation light is greater.

B. Second Preferred Embodiment

Figure 2:
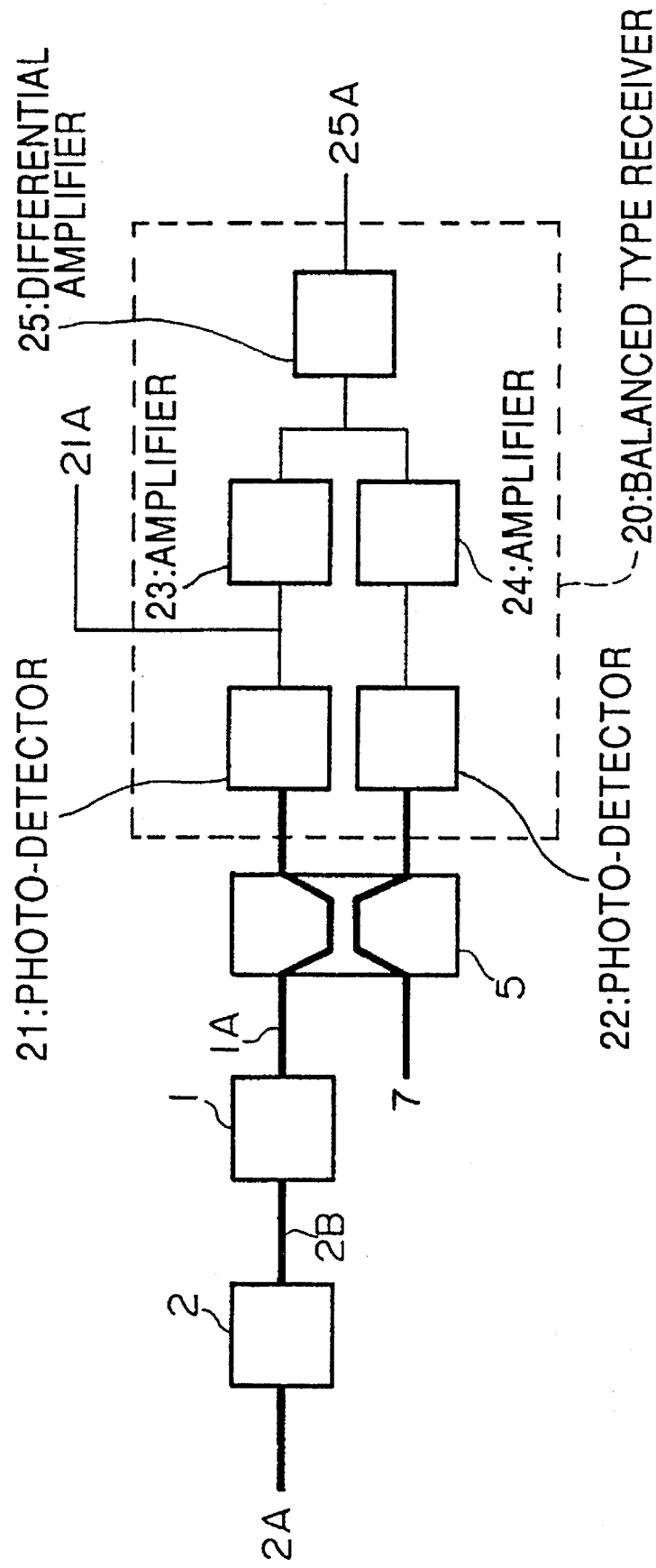
FIG. 2 is a block diagram showing the structure of an optical polarization controller according to a second preferred embodiment of the present invention.

FIG. 2 is a block diagram showing the overall structure of an optical polarization controller according to a second preferred embodiment of the present invention. In this preferred embodiment, the polarization-maintaining light divider 3 is eliminated and the signal light 1A outputted from the polarizer 1 is directly supplied to the polarization-maintaining light mixer 5 in order to reduce the transmission loss of the signal.

The balanced signal lights are obtained from the polarization-maintaining light mixer 5 and the balanced signal lights thus obtained are supplied to a balanced-type light receiver 20.

The balanced-type receiver 20 has two photo-detectors 21 and 22, two amplifiers 23 and 24, and a differential amplifier 25 as shown in FIG. 2.

One of the balanced signal lights supplied to the balanced type receiver 20 is converted to an electronic signal by the photo-detector 21. The electronic signal is amplified by the amplifier 23. The output signal of the amplifier 23 is supplied to one of the input terminals of the differential amplifier 25.

The other balanced signal light is also converted to an electronic signal by the photo-detector 22. The electronic signal is amplified by the amplifier 24. The output signal of the amplifier 24 is supplied to the other input terminal of the differential amplifier 25. As a result, a beat signal 25A is obtained from the differential amplifier 25.

In this preferred embodiment, one of the output signals of the photo-detectors 21 and 22 is detected and a control signal indicating the level 21A of the detected signal is supplied to the polarization control element 2 to control the plane of polarization of the element.

Figure 3:
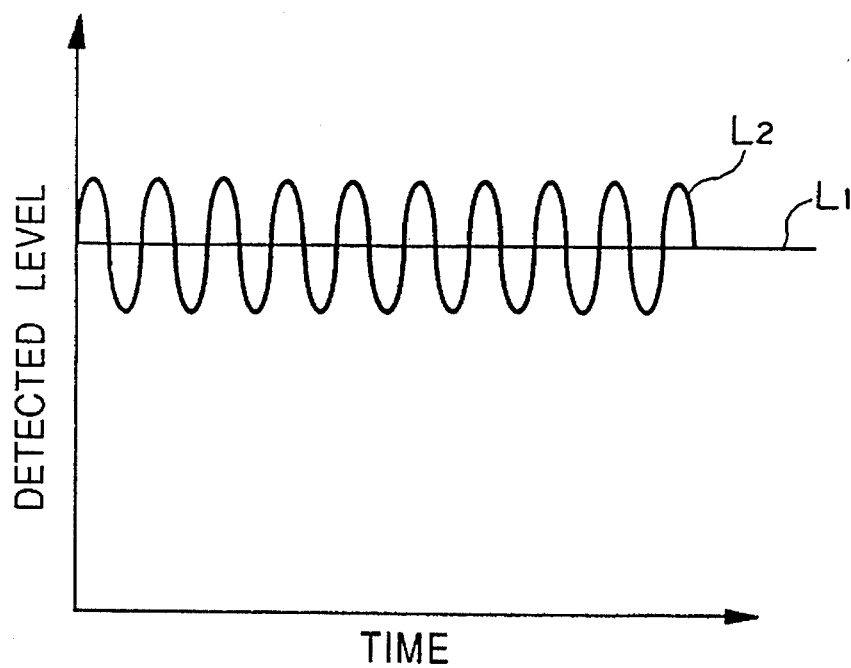
FIG. 3 shows an example of a waveform of an output signal obtained from a photo-detector employed in the second preferred embodiment.
Figure 4:
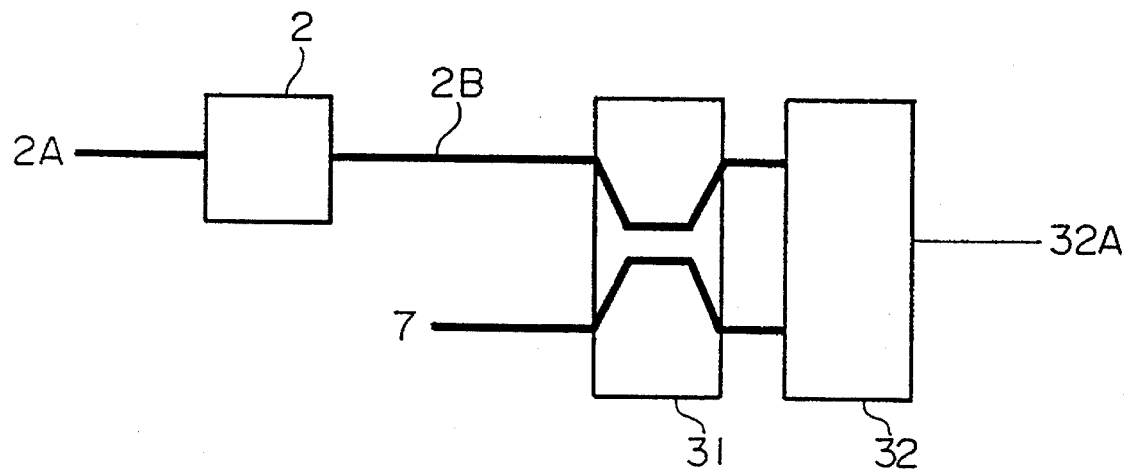
FIG. 4 is a block diagram showing the structure of a conventional optical heterodyne receiver having a polarization control element.

FIG. 3 Shows a waveform of the level 21A of the output signal which is obtained from the photo-detector 21 when CW (Continuous Wave) lights are-used as the signal light 2A and the local oscillation light 7.

The waveform of the level 21A contains two mixed levels $L_1$ and $L_2$ as shown in FIG. 3. The mixed level $L_1$ is the level of the light which is obtained by mixing the signal light 1A and the local oscillation light 7. The mixed level $L_2$ is the level of the beat signal light which has the same frequency as the frequency difference between the signal light 1A and the local oscillation light 7.

The control signal supplied to the polarization control element 2 indicates the mixed level $L_1$. The plane of polarization of the polarization control element 2 is controlled based on the control signal so that the mixed level $L_1$ of the signal light 1A and the local oscillation light 7 becomes the maximum value. Under such a control, the plane of polarization of the signal light 2B is controlled so as to correspond to the plane of polarization of the local oscillation light 7. Therefore, the beat signal 25A having the maximum level is obtained based on the interference between the signal light 2B and the local oscillation light 7.

What is claimed is:

1. An optical polarization controller comprising:

a polarization control element for rotating a plane of polarization of an input signal light by a rotation angle in a predetermined rotational direction and for outputting the result as a rotated signal light;

a polarizer for extracting a component of the rotated signal light having a predetermined plane of polarization and for outputting the component as a polarized signal light;

a light divider for dividing the polarized signal light into a plurality of polarized signal lights which have the same planes of polarization as the plane of the polarized light outputted by the polarizer; and a photo-detector for detecting a level of one of the plurality of polarized signal lights, for generating, based on the detected level of the one polarized signal light, a control signal indicating which of the planes of polarization of the rotated signal light outputted by the polarization ctonrol element is in agreement with the predetermined plane of polarization of the polarizer, and for supplying the control signal to the polarization control element to control the rotation angle.

2. An optical polarization controller according to claim 1 wherein the plane of polarization of polarized light signals correspond to a plane of polarization of local oscillation light and one of the polarized light signals is mixed with the local oscillation light by an optical heterodyne detector which generates a beat signal having a frequency corresponding to a frequency difference between the input signal light and the local oscillation light.

3. An optical polarization controller comprising:

a polarization control element for rotating a plane of polarization of an input signal light by a rotation angle in a predetermined rotational direction and for outputting the result as a rotated signal light;

a polarizer for extracting a component of the rotated signal light having a predetermined plane of polarization and for outputting the component as a polarized signal light;

a light mixer for mixing the polarized signal light and a local oscillation light having the same plane of polarization as the plane of polarization of the polarized signal light and for outputting a plurality of balanced signal lights which complement each other and have the same planes of polarization as the plane of polarization of the polarized signal light; and a balanced-type receiver for receiving the plurality of balanced signal lights from the light mixer, for converting each of the plurality of balanced signal lights into electronic balanced signal lights, for detecting a level of one of the electronic balanced signal lights, for generating, based on the detected level of the on electronic balanced signal light, a control signal which indicate which of the planes of polarization of the rotated light outputted by the polarization control element is in agreement with the predetermined plane of polarization of the polarizer, for supplying the control signal to the polarization control element to control the rotation angle, and for outputting a beat signal having a frequency corresponding to a frequency difference between the input signal light and the local oscillation light.

4. The optical polarization controller as claimed in claim 3, wherein the balanced-type receiver comprises a plurality of photo-detectors and means for detecting the level of the one electronic balanced signal at an output of one of the plurality of photo-detectors.

5. The optical polarization controller as claimed in claim 4, wherein the balanced-type receiver further includes amplification means for amplifying the electronic balanced signals outputted by the photo-detectors, and differential amplifier means for receiving the amplified electronic balanced signals from the amplification means and for outputting the beat signal.

* * * * *